Figure 1:
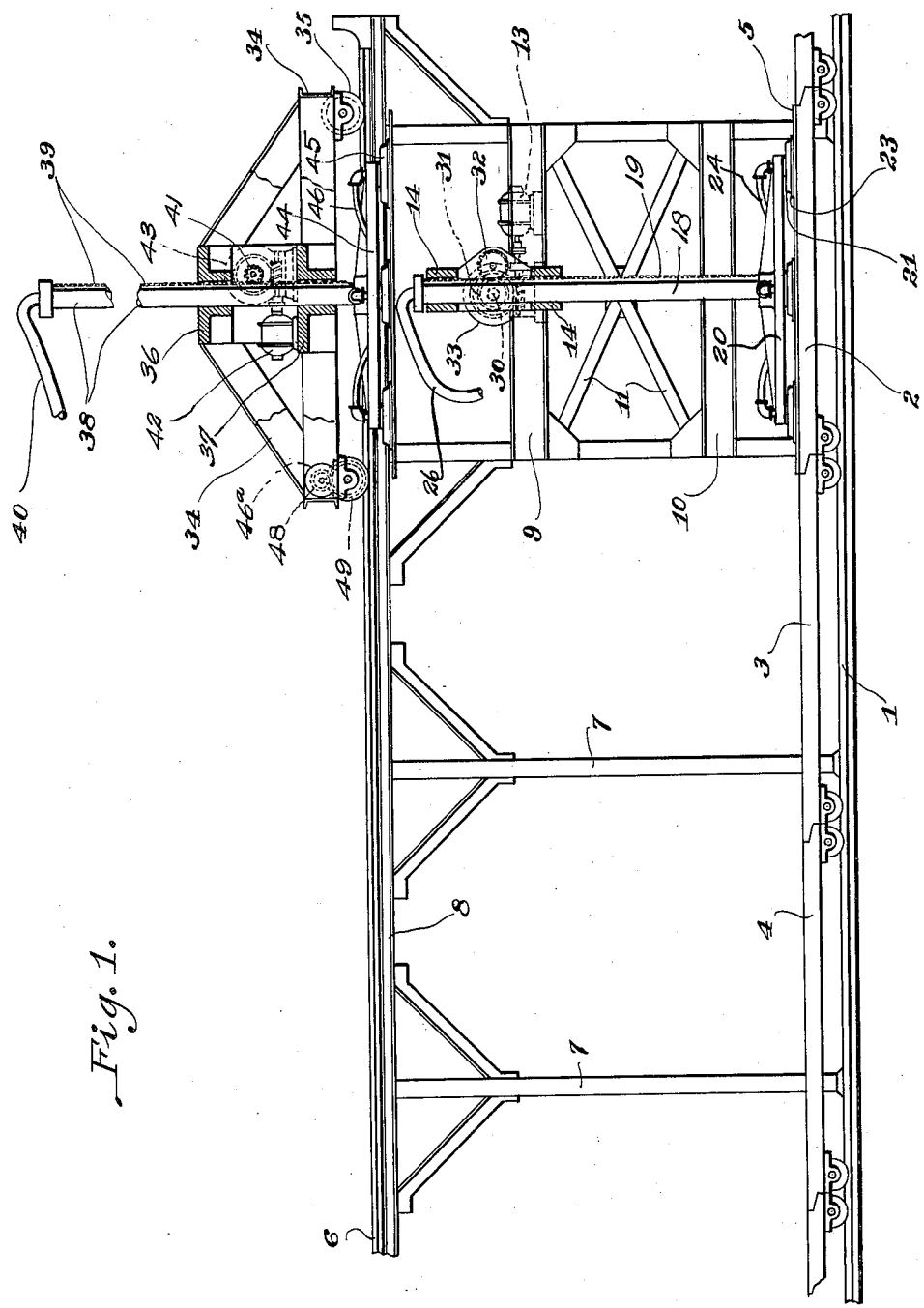

Feb. 3, 1925.

W. OWEN 1,525,147

PLATE GLASS TRANSFER APPARATUS

Filed Oct. 31, 1923   2 Sheets-Sheet 1

INVENTOR
William Owen
by
James C. Bradley
atty

Feb. 3, 1925.	1,525,147
W. OWEN
PLATE GLASS TRANSFER APPARATUS
Filed Oct. 31, 1923    2 Sheets-Sheet 2
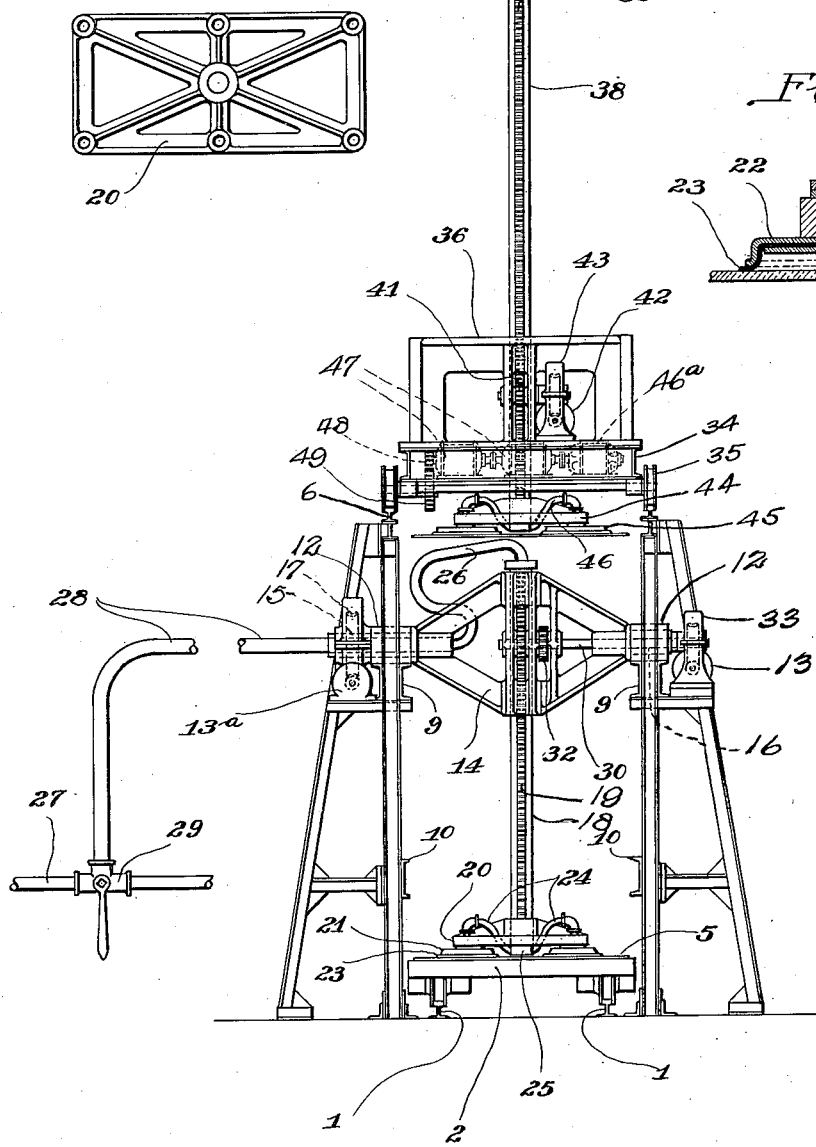
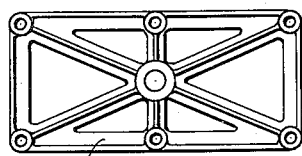
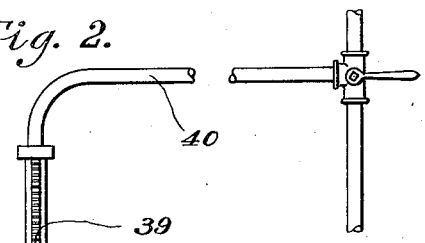
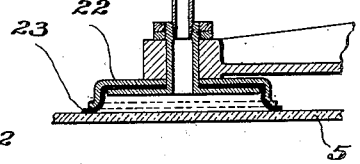
INVENTOR
William Owen
by James C. Bradley
Atty.

Patented Feb. 3, 1925.

1,525,147

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

PLATE-GLASS-TRANSFER APPARATUS.

Application filed October 31, 1923. Serial No. 671,899.

*To all whom it may concern:*

Be it known that I, WILLIAM OWEN, a citizen of the United States, and a resident of Pittsburgh, in the county of Allegheny and State of Pennsylvania, have made a new and useful invention in Improvements in Plate-Glass-Transfer Apparatus, of which the following is a specification.

The invention relates to apparatus for handling and turning over plates. The apparatus is designed particularly for picking up glass from one car or carrier, turning it over, and transferring to another car or carrier on the same track. The invention has for its principal object the provision of improved means for performing the function as above set forth. One embodiment of the invention is illustrated in the accompanying drawings wherein:

Figure 1 is a side elevation of the apparatus. Fig. 2 is an end elevation. Fig. 3 is a plan view of the vacuum frame employed. And Fig. 4 is a section through one of the suction cups.

Referring to the drawings, 1 is the track upon which are mounted a series of cars or carriers 2, 3, 4, etc., such cars being placed end to end so as to provide a continuous table and serving as a means for carrying the sheets of glass secured to their tops beneath a series of grinding and polishing machines. After one side of the glass sheets has been ground and polished, it is necessary to release them from the plaster in which they are set, turn them upside down to bring the unsurfaced side uppermost, and then seat them again in plaster upon the cars. The table 2 is shown as carrying a plate of glass 5 whose upper surface has been ground and polished, while the tables 3, 4, etc. to the left thereof are shown as empty the glass having been removed therefrom so that they are ready to receive plates, such as the plate, 5, after such plates have been reversed in position to bring the rough side up. The apparatus illustrated is designed to accomplish this operation.

Extending longitudinally of the track 1 on opposite sides thereof are a pair of rails 6, 6, constituting a crane runway or track, supported by means of the vertical frame members 7 and horizontal frame members 8. Extending horizontally between a pair of the vertical frame members 7 are the pairs of beams 9 and 10 and diagonal braces 11, and upon the frame as thus provided are supported the bearings 12, 12 and the motors 13 and 13ª. Journaled in the bearings 12 is the guide member 14 preferably a steel casting of the form indicated in Fig. 2. This frame is provided at its ends with shafts 15 and 16, the shaft 15 being hollow and carrying at its end a worm wheel 17 which meshes with a worm driven from the motor 13ª, thus providing means for rotating the frame 14.

Mounted for vertical movement through the frame 14 is a supporting bar 18 having secured along one side the rack 19. This bar carries at its lower end the vacuum frame 20 provided with the vacuum cups 21. These vacuum cups preferably consist of steel cups 22 in which are mounted rubber cups 23 for engaging the surface of the sheet 5. A flexible pipe 24 extends from the upper side of each of the cups to suitable connections 25 (Fig. 2) at the bottom of the bar 18, such bar being hollow and being connected at its upper end with the hollow shaft or trunnion 15 by means of the flexible pipe 26. The outer end of the trunnion 15 is connected to the vacuum line 27 by means of the pipe 28, a suitable three-way valve 29 being provided for securing the exhaust from the cups and for releasing such exhaust.

Extending through the hollow trunnion 12 at the right hand side of the guide member 14 is the shaft 30 for raising and lowering the bar 18. This shaft carries at its inner end a pinion 31 meshing at one end with the elongated pinion 32, which in turn engages the rack 19. The shaft 30 is keyed at its outer end to a worm wheel in the casing 33, such worm wheel being driven by a worm which is secured to the drive shaft of the motor 13.

Mounted upon the rails 6 which extend longitudinally of the track 1, is a crane consisting the truck framework 34 and the wheels 35. Carried by the truck framework are the guide members 36 and 37 in which is mounted the hollow post or bar 38 provided on one side with the rack 39 and having at its upper end a connection to the vacuum pipe 40. The post or bar 38 is raised by means of the pinion 41 which is driven from the motor 42 carried by the truck through the intermediary of a suitable worm and worm wheel in the casing 43. Carried by the lower end of the post or bar 38 is a second vacuum frame 44 provided with suction cups 45, such suction cups being connected by means of the pipes 46 to the lower end of the hollow bar or post 38. The crane is moved along the rails 6 by means of a motor 46ª operating through suitable reducing mechanism in the casings 47 to rotate the pinion 48, which engages the gear 49 keyed to the shaft carrying the wheels 35.

The operation of the device is as follows: Assuming that it is desired to transfer the plate 5 having its upper surface ground and polished from the table 2 to one of the other tables, such as the table 4, the glass 5 is first loosened from the plaster, after which the vacuum frame 20 is lowered by the motor 13 so that the suction cups 21 are pressed down tightly upon the upper surface of the glass. The valve 29 is then operated to secure a vacuum in the cups, the vacuum frame being in this manner attached to the glass sheet. The motor 13 is now operated to rotate the shaft 30 so that the pinion 32 is rotated, lifting the bar 18 and vacuum frame with the glass plate attached thereto. This upward movement is continued far enough so that the frame 21 can be inverted without interfering with the car or table. This function is accomplished by means of the motor 13ª, which operating through the worm and worm wheel in the casing 17 rotates the guide frame 14 so as to move the post 18 180 degrees from the position illustrated in Fig. 2, thus bringing the rough, unsurfaced lower face of the glass sheet 5 up. The crane 34 carrying the vacuum frame 44 is now moved along the track 6 until it is in position over the glass plate 5, the bar 18 having been lowered through the guide 14 so as to permit the truck to take this position. The motor 42 is now operated to lower the second vacuum frame 44 so that its cups 45 engage the upper surface of the glass plate 5. A suitable valve connected to the vacuum pipe 40 is now operated to exhaust the air from the cups 45, so that the glass plate is securely attached to the second vacuum frame. The valve 29 in the vacuum line 27 is now operated to release the suction in the cups 21 of the lower vacuum frame 20, thus releasing the plate from such vacuum frame. The truck or crane 34 is now moved along the track 6 until it arrives in position above the table 4 upon which the plate is to be laid. The surface of this table 4 is provided with a suitable layer of plaster and the motor 42 is then operated to cause the pinion 41 to lower the bar or post 38 until the glass is pressed down into the plaster on the table 4, after which the vacuum cups 45 are released from the plate, thus completing the operation.

What I claim is:

1. In combination in apparatus for transferring glass sheets from one carrier or car to another carrier or car mounted upon the same track, a fixed framework mounted above the track, a vacuum frame mounted in the framework for rotation and for vertical movement, a crane mounted for movement longitudinally of the track, a second vacuum frame carried by said crane, and means whereby said second vacuum frame may be moved vertically.

2. In combination in apparatus for transferring glass sheets from one carrier or car to another carrier or car mounted upon the same track, a fixed framework mounted above the track, a guide member mounted for rotation in said framework, a vacuum frame having supporting means slidably mounted in said guide member, means for moving said supporting means through the guideway, a crane mounted for movement longitudinally of the track, a second vacuum frame carried by said crane, and means whereby said second vacuum frame may be moved vertically.

3. In combination in apparatus for transferring glass sheets from one carrier or car to another carrier or car mounted upon the same track, a fixed framework mounted above the track, a guide member mounted for rotation in said framework, a vacuum frame having supporting means slidably mounted in said guide member, means for moving said supporting means through the guideway, a crane mounted for movement longitudinally of the track, a guide member carried by said crane, a second vacuum frame having supporting means mounted for vertical movement in said member, and means for moving said supporting means through said member.

4. In combination in apparatus for transferring glass sheets from one carrier or car to another carrier or car mounted upon the same track, a fixed framework mounted above the track, a guide member mounted for rotation in said framework, a vacuum frame having a supporting bar provided with a rack slidably mounted in said guide member, a pinion carried by said guide member and engaging said rack, means for rotating the pinion, a crane mounted for movement longitudinally of the track, a second vacuum frame carried by said crane, and means whereby said second vacuum frame may be moved vertically.

5. In combination in apparatus for transferring glass sheets from one carrier or car to another carrier or car mounted upon the same track, a fixed framework mounted above the track, a guide member mounted for rotation in said framework, a vacuum frame having a crane mounted for movement longitudinally of the track, a guide member carried by said crane, a second vacuum frame provided with a rack slidably mounted in said guide member, a pinion carried by said guide member and engaging said rack, and means for rotating said pinion.

In testimony whereof, I have hereunto subscribed my name this 19th day of Oct., 1923.

WILLIAM OWEN.